(12) United States Patent
Korischem et al.

(10) Patent No.: US 6,848,609 B2
(45) Date of Patent: Feb. 1, 2005

(54) METHOD OF MAKING FINNED TUBES

(75) Inventors: Benedict Korischem, Düsseldorf (DE); Horia Dinulescu, Minnetonka, MN (US); Raimund Witte, Dortmund (DE); Eckard Volkmer, Ratingen (DE)

(73) Assignee: GEA Energietechnik GmbH, Bochum (DE)

( * ) Notice: Subject to any disclaimer, the term of this patent is extended or adjusted under 35 U.S.C. 154(b) by 0 days.

(21) Appl. No.: 10/738,247

(22) Filed: Dec. 16, 2003

(65) Prior Publication Data

US 2004/0149811 A1 Aug. 5, 2004

Related U.S. Application Data

(63) Continuation-in-part of application No. 10/201,582, filed on Jul. 22, 2002, now Pat. No. 6,715,667, which is a continuation of application No. PCT/DE01/00223, filed on Jan. 18, 2001.

(30) Foreign Application Priority Data

Jan. 28, 2000 (DE) .......................................... 100 03 874
Nov. 17, 2000 (DE) .......................................... 100 57 180

(51) Int. Cl.[7] .......................... B23K 31/02; B23K 1/20; B23K 35/34; B23K 1/19
(52) U.S. Cl. ....................... 228/183; 228/129; 228/223; 228/262.41; 228/262.42; 228/262.51; 228/146; 148/23; 428/659
(58) Field of Search ................................ 228/129, 146, 228/183, 219, 223, 262.41, 262.42, 262.51; 148/23; 428/659

(56) References Cited

U.S. PATENT DOCUMENTS

| 2,650,420 | A | * | 9/1953 | True ............................ 228/185 |
| 4,389,463 | A | * | 6/1983 | Smeggil et al. ............. 428/659 |
| 4,655,385 | A | * | 4/1987 | Suzuki et al. ................ 228/223 |
| 5,042,574 | A | * | 8/1991 | Cottone et al. ............. 165/133 |
| 5,110,035 | A | * | 5/1992 | Reynolds et al. ........... 228/183 |
| 5,171,377 | A | * | 12/1992 | Shimizu et al. ................ 148/23 |
| 5,190,596 | A | * | 3/1993 | Timsit .......................... 148/23 |
| 5,305,945 | A | * | 4/1994 | Cottone et al. ............. 228/183 |
| 5,418,072 | A | * | 5/1995 | Baldantoni et al. ......... 428/558 |
| 5,490,559 | A | * | 2/1996 | Dinulescu ................... 165/148 |
| 5,617,992 | A | * | 4/1997 | Huddleston et al. ........ 228/183 |
| 5,799,726 | A | * | 9/1998 | Frank .......................... 165/156 |
| 6,109,510 | A | * | 8/2000 | Otsuka et al. ......... 228/262.51 |
| 6,715,667 | B2 | * | 4/2004 | Korischem et al. ......... 228/183 |
| 2002/0127135 | A1 | * | 9/2002 | Ohara et al. ................ 420/531 |

FOREIGN PATENT DOCUMENTS

| EP | 0 785045 | | 7/1997 |
| EP | 0 845 321 | | 6/1998 |
| EP | 0965411 A1 | * | 12/1999 |
| EP | 0 965 411 | | 12/1999 |
| JP | 49-076753 A | * | 7/1974 |
| JP | 59-78719 A | * | 5/1984 |
| JP | 59-82114 A | * | 5/1984 |
| JP | 59 082114 | | 5/1984 |
| WO | WO-01/54840 A2 | * | 8/2001 |

* cited by examiner

Primary Examiner—Lynne R. Edmondson
(74) Attorney, Agent, or Firm—Henry M. Feiereisen

(57) ABSTRACT

In a method of making finned tubes as components of air-cooled systems or condensers, a sheet metal strip of aluminum is first shaped into a waved finned structure with plural fins in parallel relationship and arched ends for connecting the fins, thereby defining crests on opposite ends of the finned structure. A fluxing agent of cesium-aluminum tetrafluoride is applied in lines onto the crests on at least one of the ends of the finned structure. The finned structure is then placed upon a broad side of a flat steel tube coated with a zinc/aluminum alloy. The finned structure and the flat tube are subsequently joined in a brazing furnace in the presence of an inert gas at a temperature between 370° C. and 470° C. to produce a unitary structure which is then allowed to cool down at room temperature.

13 Claims, 2 Drawing Sheets

METHOD OF MAKING FINNED TUBES

CROSS-REFERENCES TO RELATED APPLICATIONS

This application is a continuation-in-part of prior filed copending U.S. application Ser. No. 10/201,582, filed Jul. 22, 2002, now U.S. Pat. No. 6,715,667, which is a continuation of prior filed copending PCT International application no. PCT/DE01/00223, filed Jan. 18, 2001 and claims the priority of German Patent Applications, Serial Nos. 100 03 874.3, filed Jan. 28, 2000, and 100 57 180.8, filed Nov. 17, 2000.

BACKGROUND OF THE INVENTION

The present invention relates to a method of making finned tubes as components of air-cooled systems or condensers.

U.S. Pat. No. 5,042,574, issued to Cottone et al. on Aug. 27, 1991, discloses a process to connect flattened tubes of aluminum through intervention of an aluminum-silicon solder to serpentine fins of aluminum in a controlled atmosphere furnace. The connection of the serpentine aluminum fins to the flat tubes of steel with the aluminum-silicon solder by means of a brazing process which can be carried out only when the flattened tubes or the fins have been coated with an aluminum based coating beforehand. This additional step is time-consuming and complicates the overall process because various pre-materials must be prepared and the welding zone of the longitudinal weld to close the flat tube about the circumference may not be coated with aluminum. Otherwise, a reliable weld cannot be ensured. The regions of the flat tubes have to be liberated from welding byproducts and then protected against corrosion.

These conventional finned tubes comprised of flat steel tubes with serpentine finned aluminum structures have the further drawback that the brazing operation of the aluminum-plated flat tubes with the finned structures is carried out at comparably high temperatures, exceeding 600° C. In other words, the brazing operation is carried out near the softening temperature of aluminum so that the aluminum fins are prone to denting that adversely affect its functionality. The solder used here is an aluminum-silicon eutectic which melts slightly below the softening point of aluminum. Also, in view of the different thermal expansion coefficients between aluminum and steel, these materials, after undergoing the brazing operation at a temperature of about 600° C., warp after the subsequent cool down period, and may ultimately lead to a disintegration of the brazed areas.

Japanese patent publication JP 590 82 114 A discloses a method of applying a helical aluminum fin onto a steel tube, whereby an aqueous tin-chloride/zinc-chloride solution is used for brazing. Zinc-chloride is, however, not stable in an aqueous solution and dissociates instantaneously to zinc oxide which also precipitates. In addition, zinc chloride is highly hygroscopic. A batch of zinc chloride disintegrates under normal atmospheric pressure in seconds to an aqueous solution or dispersed milk through hygroscopic absorption of water. Furthermore, when operating with solvents that are free of water (explosion protection), the solvents must be covered with an aluminum foil during application for reasons of condensation and moisture protection. When large surfaces are involved, this method would not be viable economically. Tin does not form an eutectic with aluminum during brazing at low level. A chemically intimate bond, in which diffusion processes are relevant, is not realized.

European patent publication EP 0 845 321 A1 discloses a process for brazing a die-cast aluminum material, using cesium-aluminum tetrafluoride as fluxing agent.

It would be desirable and advantageous to provide an improved method of joining waved fin-like structures of aluminum with the broad sides of flat tubes of steel to obviate prior art shortcomings and to reduce labor and energy costs as well as material consumption.

SUMMARY OF THE INVENTION

According to one aspect of the present invention, a method of making finned tubes as components of air-cooled systems or condensers, includes the steps of shaping a sheet metal strip of aluminum into a waved finned structure with plural fins in parallel relationship and arched ends for connecting the fins to thereby define crests on opposite ends of the finned structure, applying a fluxing agent of cesium-aluminum tetrafluoride in lines onto the crests on at least one of the ends of the finned structure, placing the finned structure upon a broad side of a flat steel tube which is coated with a zinc/aluminum alloy, joining the finned structure and the flat tube in a brazing furnace in the presence of an inert gas at a temperature between 370° C. and 470° C. to produce a unitary structure, and allowing the unitary structure to cool down at room temperature.

The present invention resolves prior art problems by using a zinc-aluminum alloy as solder for application onto the broad sides of the flat tubes of steel. Application of the solder may be realized by means of a flame spraying process. It is hereby possible, to use acetyls or also natural gas. A wire, having the composition of the solder, is hereby melted and spread evenly upon the respective surface as a result of the gas under pressure. An alternative to the flame spraying process is the electric-arc process. In this case, an electric arc is produced by means of two wires having the composition of the solder, thereby melting the wires. At the same time, air or an inert gas is blown in so that the melted solder is evenly distributed onto the surfaces of the flat steel tubes. Structure and operation of a flame spraying process or electric-arc process are generally known to an artisan so that a detailed description has been omitted for the sake of simplicity. Also, galvanization with the solder in the stated composition is conceivable. Finally, it is also feasible to apply a layer, made of the solder in a composition according to the invention, onto the respective surfaces through pressure, plating or sintering.

The present invention is based on the recognition that the use of a flux in the form of cesium-aluminum tetrafluoride allows a reduction of the brazing temperature from conventionally 600° C. to a range between 370° C. and 470° C. The decrease of the brazing temperature not only reduces the brazing time by about 30% to 40% but also significantly saves labor costs and energy costs. These savings are especially noticeable by the fact that only the contact zones between the finned structure and the flat tubes are wetted with the flux. These contact zones are formed by the arched zones of the waved fin-like structures (arched sections). Application may be realized through immersions or spraying.

As stated above, the conventional brazing operation at temperatures exceeding 600° C., leads to annealing of the aluminum fins which are thus softened. As a consequence, the strength of the fin-like structure is adversely affected. In view of the significant decrease of the brazing temperature by the method according to the present invention, soft annealing does no longer occur, so that the fins maintain their full strength properties.

After brazing in the furnace, the joined assembly of flat tubes and finned structures is subjected to the ambient temperature (room temperature) and thus cooled down so that the finned structures are connected with the flat tubes in proper heat conducting manner.

The special solder of a zinc-aluminum alloy in conjunction with the special fluxing agent in the form of cesium-aluminum tetrafluoride thus enables a melting of the solder layer at the desired temperature between 370° C. and 470° C. and a softening or melting of aluminum of the finned structure is positively precluded. In this context, the driving force is the eutectic zinc/aluminum, whereby aluminum is alloyed in the solder in order to prevent the liquid zinc from dissolving the aluminum of the finned structure.

The particular flux in the form of cesium-aluminum tetrafluoride may be prepared on an alkaline, acidic or neutral base.

According to another feature of the present invention, the finned structure may be made of aluminum of grade 99.5 or AA 3003. This material is advantageous for the manufacture of a waved finned structure on a fin folding machine.

According to another feature of the present invention, brazing of the finned structure to the flat tube may be carried out at a temperature of about 430° C.

The respective brazing temperature is dependent on the fraction of aluminum in the coating upon the flat tube (solder). The higher the aluminum fraction, the higher the brazing temperature. Suitably, the coating of zinc-aluminum alloy has an aluminum fraction of 0.5% by wt. to 20% by wt. Currently preferred is the application of a coating of zinc-aluminum alloy with an aluminum fraction of 5% by wt. to 15% by wt.

According to another feature of the present invention, the ratio of the wall thickness of the flat tube to the thickness of the finned structure may range between 2.5:1 and 10:1. Currently preferred is a ratio between 4:1 and 8:1. Thus, the provision of a very thin finned structure is sufficient. Taking into account the thin finned structure, also the eutectic between the finned structure and the broad side of the flat tube becomes relevant in view of the firm bond of zinc and aluminum. This prevents a penetration of zinc into the aluminum surface of the finned structure and thus a formation of an intermetallic phase.

According to another feature of the present invention, the ratio of the width of the flat tube to the height of the flat tube may range between 5:1 and 35:1. Currently preferred is a ratio between 8:1 and 15:1.

According to another feature of the present invention, the ratio of the height of the finned structure to the pitch of the finned structure may range between 5:1 and 35:1. Currently preferred is a ratio between 8:1 and 15:1.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
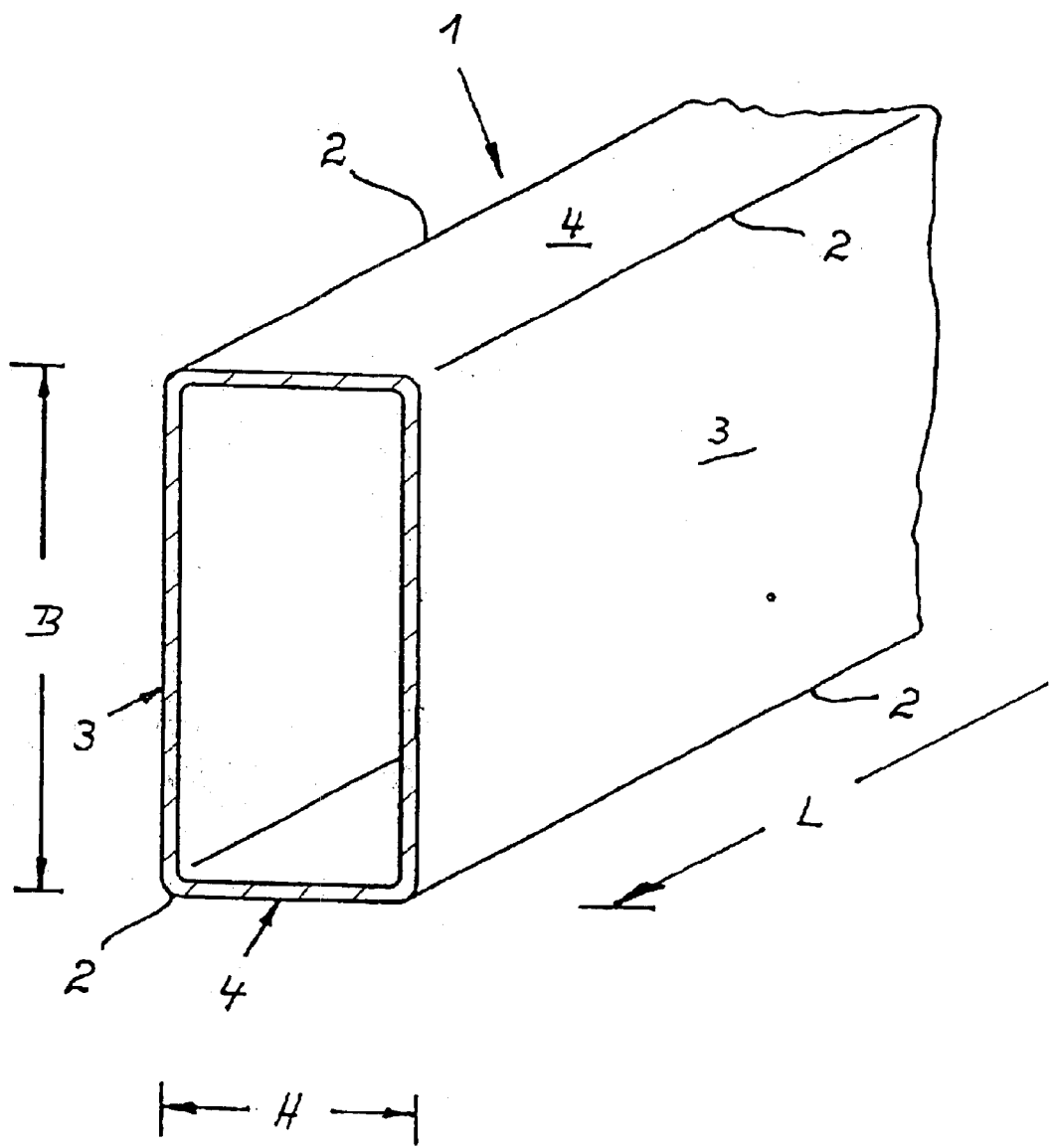
FIG. 1 is a schematic perspective illustration of a flat tube.

Throughout all the Figures, same or corresponding elements are generally indicated by same reference numerals.

These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a flat tube, generally designated by reference numeral 1 and made of steel. The flat tube is generally rectangular in cross section with rounded corners 2 between broad sides 3 and narrow sides 4. The ratio between width B of the flat tube 1 in relation to its height H is between 5:1 and 35:1, preferably between 8:1 and 15:1. The flat tube 1 may have a length L of several meters.

Figure 2:
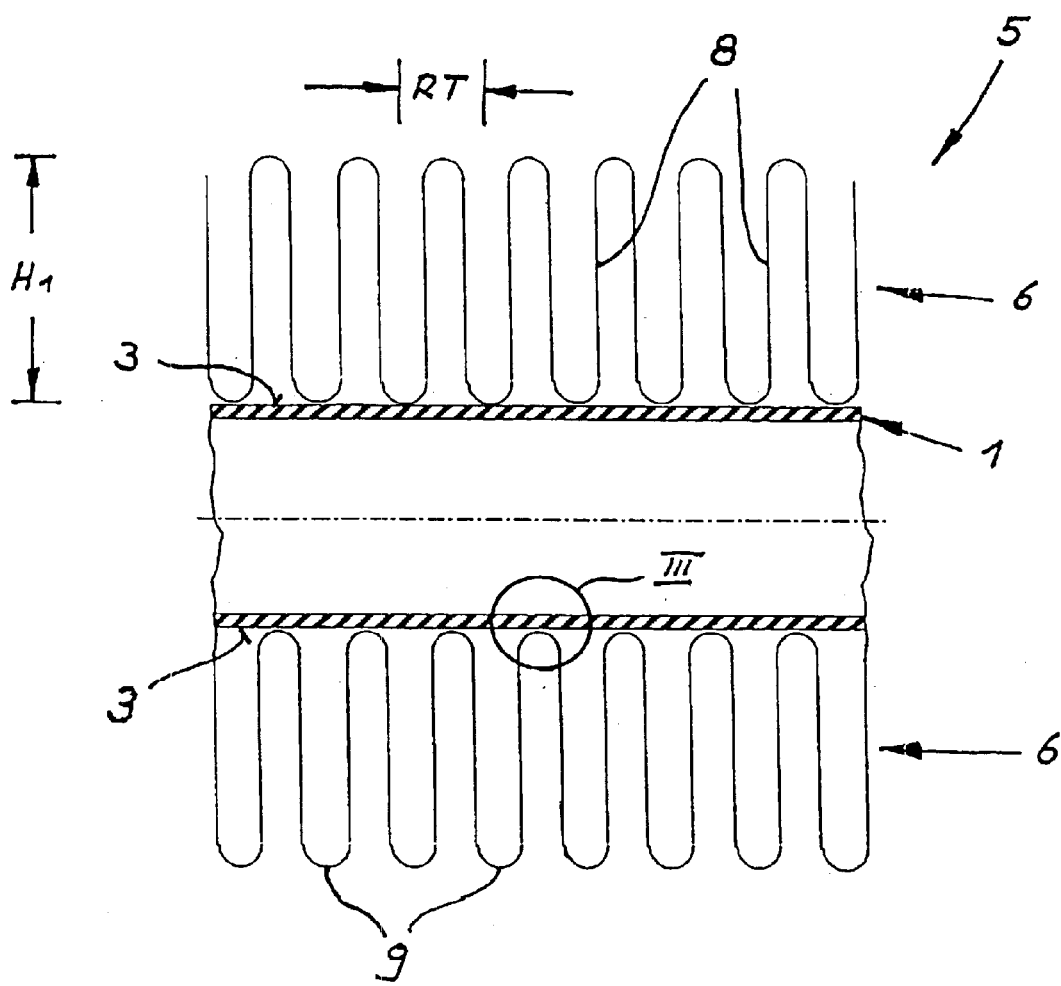
FIG. 2 is a schematic longitudinal section of the flat tube of FIG. 1 in combination with a finned structure on both broad sides of the flat tube.

Turning now to FIG. 2, there is shown a schematic longitudinal section of the flat tube 1 in combination with a finned structure 6 for providing a finned tube 5 for use in air-cooled systems or condensers. The rib structure 6 is typically configured in the form of a waved strip and made of aluminum of grade 99.5 or AA 3003.

Figure 3:
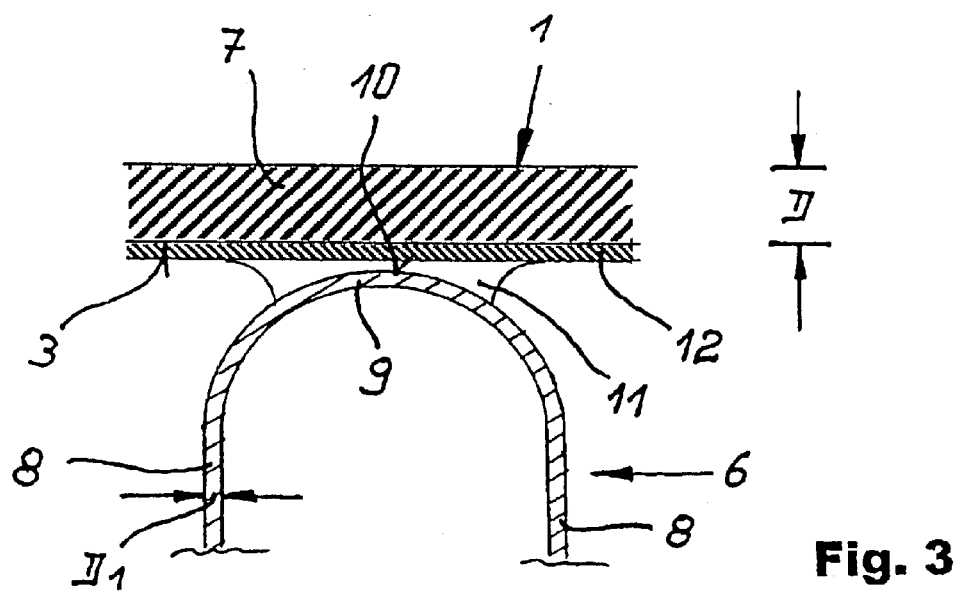
FIG. 3 is an enlarged detailed view of the area encircled in FIG. 2 and marked III.

As shown in FIG. 3, which is an enlarged detailed view of the area encircled in FIG. 2 and marked III, the flat tube 1 has a wall 7 of a thickness $D_1$ whereby the ratio of the wall thickness D in relation to the thickness $D_1$ of a finned strip ranges between 2.5:1 and 10:1, preferably between 4:1 and 8:1. The ratio of the height $H_1$ (FIG. 2) of the finned structure 6 in relation to a pitch RT (FIG. 2) between adjacent fins 8 ranges between 5:1 and 35:1, preferably between 8:1 and 15:1.

Manufacture of the finned tube 5 is as follows: A sheet metal strip of aluminum is first shaped into the waved finned structure 6 with plural fins 8 disposed in parallel relationship. The fins 8 are joined at their ends by arched sections 9, whereby the wave crests 10 of the arched sections 9, before attachment to the broad sides of the flat tube 1, are coated in lines with a fluxing agent 11 of cesium aluminum tetrafluoride. At the same time, the broad sides 3 of the flat tube 1 are coated with a coating 12 of a zinc-aluminum alloy having an aluminum content of 0.5 wt. % to 20 wt. %, currently preferred 5 wt. % to 15 wt. %.

The finned structure 6 is joined to the flat tube 1 in a brazing furnace (not shown) in the presence of inert gas at a temperature between 370° C. and 470° C., preferably about 430° C. After the brazing process, the joined unitary structure of flat tube 1 and finned structure 6 is cooled down at room temperature. The flux 11 is hereby transformed to an eutectic of zinc and aluminum.

Of course, the method according to the present invention makes it possible to join several flat tubes 1 via a plurality of finned structures 6 and to connect this entire configuration in a brazing furnace to produce a finned tube assembly.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A method of making finned tubes as components of air-cooled systems or condensers, comprising the steps of:

shaping a sheet metal strip of aluminum into a waved finned structure with plural fins in parallel relationship and arched ends for connecting the fins, thereby defining crests on opposite ends of the finned structure;

applying a fluxing agent of cesium-aluminum tetrafluoride in lines onto the crests on at least one of the ends of the finned structure, placing the finned structure upon a broad side of a flat steel tube which is coated with a zinc/aluminum alloy;

joining the finned structure and the flat tube in a brazing furnace in the presence of an inert gas at a temperature between 370° C. and 470° C. to produce a unitary structure; and allowing the unitary structure to cool down at room temperature.

2. The method of claim 1, wherein the finned structure is a waved strip.

3. The method of claim 1, wherein the finned structure is made of aluminum of grade 99.5 or AA 3003.

4. The method of claim 1, wherein the joining step is carried out at a temperature of about 430° C.

5. The method of claim 1, wherein the coating of zinc-aluminum alloy has an aluminum fraction of 0.5 wt. % to 20 wt. %.

6. The method of claim 1, wherein the coating of zinc-aluminum alloy has an aluminum fraction of 5 wt. % to 15 wt. %.

7. The method of claim 1, wherein the flat tube has a wall thickness and the finned structure has a thickness, wherein the ratio of the wall thickness of the flat tube to the thickness of the finned structure ranges between 2.5:1 and 10:1.

8. The method of claim 1, wherein the flat tube has a wall thickness and the finned structure has a thickness, wherein the ratio of the wall thickness of the flat tube to the thickness of the finned structure ranges between 4:1 and 8:1.

9. The method of claim 1, wherein the flat tube has a width and a height, wherein the ratio of the width of the flat tube to the height of the flat tube ranges between 5:1 and 35:1.

10. The method of claim 1, wherein the flat tube has a width and a height, wherein the ratio of the width of the flat tube to the height of the flat tube ranges between 8:1 and 15:1.

11. The method of claim 1, wherein the finned structure has a height and is defined by a pitch between succeeding fins, wherein the ratio of the height of the finned structure to the pitch of the finned structure ranges between 5:1 and 35:1.

12. The method of claim 1, wherein the finned structure has a height and is defined by a pitch between succeeding fins, wherein the ratio of the height of the finned structure to the pitch of the finned structure ranges between 8:1 and 15:1.

13. The method of claim 1, wherein the zinc/aluminum alloy is applied onto the flat tube by a process selected from the group consisting of flame spraying process, electric-arc process, galvanization, pressure application, plating, and sintering.

* * * * *